US012798314B2

(12) United States Patent
Prestia

(10) Patent No.: US 12,798,314 B2
(45) Date of Patent: Nov. 17, 2026

(54) INTERMODAL TRANSPORT VEHICLES AND SYSTEMS

(71) Applicant: Paul Prestia, Sanibel, FL (US)

(72) Inventor: Paul Prestia, Sanibel, FL (US)

( * ) Notice: Subject to any disclaimer, the term of this patent is extended or adjusted under 35 U.S.C. 154(b) by 518 days.

(21) Appl. No.: 18/552,307

(22) PCT Filed: Oct. 8, 2021

(86) PCT No.: PCT/US2021/054180
§ 371 (c)(1),
(2) Date: Sep. 25, 2023

(87) PCT Pub. No.: WO2022/203720
PCT Pub. Date: Sep. 29, 2022

(65) Prior Publication Data
US 2024/0181822 A1 Jun. 6, 2024

Related U.S. Application Data

(60) Provisional application No. 63/165,893, filed on Mar. 25, 2021.

(51) Int. Cl.
*B60F 1/04* (2006.01)
*B60B 19/02* (2006.01)
*B60F 1/02* (2006.01)

(52) U.S. Cl.
CPC .............. *B60F 1/046* (2013.01); *B60B 19/02* (2013.01); *B60F 1/02* (2013.01)

(58) Field of Classification Search
CPC ....... B60B 11/02; B60B 17/006; B60B 19/02; B60B 2900/351; B60F 1/00; B60F 1/02; B60F 1/04; B60F 1/046; B61D 15/00
See application file for complete search history.

(56) References Cited

U.S. PATENT DOCUMENTS 1,853,572 A 4/1932 Nugent
1,926,695 A 9/1933 Hutton
(Continued)

FOREIGN PATENT DOCUMENTS

CA 2344515 A1 10/2002
CN 104908517 A 9/2015
(Continued)

OTHER PUBLICATIONS

"Coaches for Road or Rail", Railway Wonders of the World, downloaded from the internet Sep. 26, 2023, from https://www.railwaywondersoftheworld.com/coaches-for-road-rail.html, 9 pages.
(Continued)

*Primary Examiner* — Jason C Smith
(74) *Attorney, Agent, or Firm* — Buchanan Ingersoll & Rooney PC

(57) ABSTRACT

Autonomously drivable vehicles, selectively controllable by on-board and remote controllers and capable of travel on both conventional railways and conventional roadways by virtue of bimodal wheel combinations of roadways wheels and railway wheels, the latter of slightly smaller radius than that of the former, are disclosed. Vehicle direction and speed are alternatively and selectively controlled by (1) an onboard vehicle controller (autonomous and/or personal) or (2) a remote controller (as in a locomotive or central rail network management system). In railway mode, direction is controlled by track-following railway wheels and movement is propelled either by an on-board motor or motors or by locomotive force supplied by a connected vehicle such as a conventional locomotive.

21 Claims, 8 Drawing Sheets

(56) References Cited

U.S. PATENT DOCUMENTS

| | | | | | |
|---|---|---|---|---|---|
| 2,002,901 | A | | 5/1935 | Main | |
| 2,042,265 | A | | 5/1936 | Main | |
| 2,135,307 | A | * | 11/1938 | Keator | B60F 1/02<br>301/38.1 |
| 2,193,046 | A | | 3/1940 | Strauss | |
| 2,657,947 | A | | 11/1953 | Kerner | |
| 3,701,323 | A | | 10/1972 | Cox | |
| 5,826,517 | A | * | 10/1998 | Larson, Jr. | B61F 3/12<br>105/4.3 |
| 6,324,994 | B1 | * | 12/2001 | Glenn | B62M 6/75<br>105/72.2 |
| 6,763,767 | B2 | * | 7/2004 | Jackson | B60F 1/043<br>105/72.2 |
| 7,077,065 | B2 | * | 7/2006 | Tremblay | B60B 19/02<br>105/72.2 |
| 8,061,277 | B2 | | 11/2011 | Jacob | |
| 8,365,674 | B2 | * | 2/2013 | Banwart | B61D 3/184<br>105/182.1 |
| 8,677,907 | B2 | * | 3/2014 | Graaff | B60F 1/046<br>105/215.2 |
| 10,901,413 | B2 | | 1/2021 | Yeung et al. | |
| 10,916,072 | B2 | | 2/2021 | Bachant et al. | |
| 2003/0172837 | A1 | * | 9/2003 | Whiston | B61D 15/00<br>105/215.2 |
| 2007/0028798 | A1 | * | 2/2007 | Langenbeck | B61B 15/00<br>105/72.2 |
| 2007/0089637 | A1 | | 4/2007 | Sproat | |
| 2010/0294848 | A1 | * | 11/2010 | Bullis | B60B 17/0072<br>188/41 |
| 2018/0065433 | A1 | | 3/2018 | Sun et al. | |
| 2018/0073200 | A1 | | 3/2018 | Rosendale | |
| 2018/0257681 | A1 | * | 9/2018 | Wike | B61F 5/06 |
| 2024/0181822 | A1 | * | 6/2024 | Prestia | B60B 19/02 |

FOREIGN PATENT DOCUMENTS

| | | | | | |
|---|---|---|---|---|---|
| CN | 204749727 | U | | 11/2015 | |
| EP | 0642428 | B1 | * | 8/1997 | B61D 3/184 |
| GB | 2280644 | A | | 2/1995 | |
| WO | 0187684 | A1 | | 11/2001 | |
| WO | 2014033750 | A1 | | 3/2014 | |
| WO | 2016007393 | A1 | | 1/2016 | |

OTHER PUBLICATIONS

International Search Report and Written Opinion for International Application No. PCT/US2021/054180, dated Feb. 14, 2022, 12 pages.
Maharajpur, G., "Coach Watering System", Govt. of India, Ministry of Railways, Standardisation of Enroute Carriage Watering System, Oct. 2008, 33 pages.
International Preliminary Report on Patentability for International Application No. PCT/US2021/054180, dated Sep. 12, 2023, 9 pages.
Covert, "The Silvertip Blade Runner", Future Festival World Summit Toronto #1 Innovation Conference Sep. 26-28, (Sep. 24, 2008), 5 pages.
Hanlon, "Blade Runner Dual-mode vehicle", Automotive, (Jan. 20, 2004), 10 pages.
"Coaches for Road or Rail", Mike's Railway History, A Look at Railways in 1935 & Before, (Date unknown), 6 pages.
"Zephir Electric Rail Car Mover" (Date unknown), 4 pages.

* cited by examiner

INTERMODAL TRANSPORT VEHICLES AND SYSTEMS

CROSS-REFERENCE TO RELATED APPLICATIONS

This application is a U.S. national phase of PCT Patent Application No. PCT/US21/054180, filed Oct. 8, 2021, which claims priority to U.S. Provisional Patent Application No. 63/165,893, filed Mar. 25, 2021, entitled INTERMODAL TRANSPORT VEHICLES AND SYSTEMS, the contents of each of which are incorporated herein by reference in their entireties for all purposes.

INTRODUCTION AND BACKGROUND

Long range transport, particularly of freight by conventional railroad trains, suffers tremendous inefficiency due to 1) the time lost in transferring the freight (or passengers in the case of passenger or commuter trains) from and to separate carriers for transporting that freight (or passengers) from and to individualized points of origin and destinations away from rail networks, 2) in the railyard switching of trains and rail cars to assemble and disassemble the trains and in the reassembly of freight cars to trains headed to different destinations in railroad marshalling yards and 3) difficulties in train scheduling caused by the time constraints of the assembly, disassembly and reassembly problems.

Another inefficiency in present long-range transport involves the time and resources committed to trucks personally driven over long distances on congestion-limiting highways. And while roadways may be over-used, long distance railway lines remain unused for long periods of time between the passage of trains over any individual segment. Meanwhile driver shortages plague the trucking industry even as it faces enormous projected growth in the coming decades, not likely to be matched by a corresponding expansion of road networks.

A wide variety of vehicles capable of operating on both railways and on roadways are well known (see for example U.S. Pat. No. 1,853,572-Nugent, U.S. Pat. No. 2,135,307-Keator, U.S. Pat. No. 2,042,265-Main, U.S. Pat. No. 2,193,046-Strauss, U.S. Pat. No. 2,657,947-Kerner, U.S. Pat. No. 3,701,323-Cox, U.S. Pat. No. 8,061,277-Jacob, U.S. Pat. No. 7,077,065-Tremblay, US Applications 2007/0089637-Sproat, 2018/0065433-Sun et al, and international applications WO 2014/033750 Muthusamy and GB application U.S. Pat. No. 2,280,644). Also well known are a wide variety of autonomously operable vehicles and vehicle control systems, including autonomously driven trains, cars and trucks and systems for selective control of autonomous vehicles by on-board and remote controllers, and also including a variety of sensors and actuators specifically adapted for such systems (see for example U.S. Pat. No. 10,901,413-Yeaung et al and U.S. Pat. No. 10,916,072-Bachant et al). While the practical efficacy of many of the concepts and elements disclosed in such publications is yet to be realized, their practical potential is widely publicized. Specific combinations of certain of these concepts and elements, as disclosed herein with modification to make them practical for use on existing railways and roadways, should be particularly valuable.

BRIEF DESCRIPTION OF INVENTION

Disclosed herein are autonomously operable transport vehicles capable of traveling on both conventional roadway and conventional railway networks, either independently or as part of a train or convoy. These vehicles are supported on bimodal wheel sets including both roadway wheels and railway wheels, all laterally spaced to conform to conventional railways and conventional roadways, the radius of the roadway wheels exceeding that of the railway wheels by an amount slightly less than the rail height of railway networks on which the vehicles are designed to operate. Transition ramps effect vehicle transition from rail wheels to road wheels and vice versa at roadway-railway crossings and at rail lines intersections. Each vehicle is selectively controllable either by an individual vehicle on-board controller or by a remote controller as may be located in a locomotive with which the vehicle is engaged or in a remote train system management location. The autonomous drivability and selective controllability of such a vehicle (1) enables its transfer on and off railways from and to roadways and vice versa and from one railroad track to another, without a human driver aboard, and (2) enables its operability on conventional roadways, with or without a driver, as regulations may require. For non-independent operation, remotely controlled couplers facilitate connection to and disconnection from other train or convoy vehicles, similarly equipped. Preferably, vehicles intended for integration with conventional train sets will be consigned to the rear end of such trains, enabling the use of efficient coupling, braking and shared power systems unattainable with conventional railroad technology.

At least one paired bimodal wheel set is adapted to selectively provide roadway steerage in roadway mode and to permit railway steerage, with roadway steerage disengaged, in railway mode. Preferably, the supportive structure of at least one paired bimodal wheel set, distal from other supportive wheels sets along the length of the vehicle, is selectively pivotally mounted to permit railway alignment of the wheels in railway mode and to prevent such pivotal movement in the roadway mode.

An electrically driven embodiment of such vehicles may include a drive motor associated with a bimodal wheel set support structure of the vehicle and connected to provide motive power to the one or more wheel set pairs associated with that structure A train comprised of vehicles as disclosed herein may be propelled by a drive motor or engine in a master vehicle such as a locomotive or by motors in the individual vehicles or by some combination thereof, in which case, motors in the individual vehicles may be selectively activated on demand to assist the locomotive drive motor in particular situations such as on start-up or for uphill climbs. As another aspect of such a power sharing system, such a train including electrically powered vehicles may also include specialized vehicles, such as fully charged battery cars or generator cars from which other electrically driven vehicles in the train may be charged. Still other specialized vehicles may include exclusively autonomously drivable vehicles (i.e. vehicles not adapted for personal driver control), intended only for railway yard use, and exclusively autonomously drivable vehicles with specialized couplers for coupling conventional railway cars with non-conventional vehicles, such as those disclosed herein.

A more detailed description of this invention, illustrated with exemplary embodiments thereof, follows.

DETAILED DESCRIPTION OF INVENTION

Figure 1:
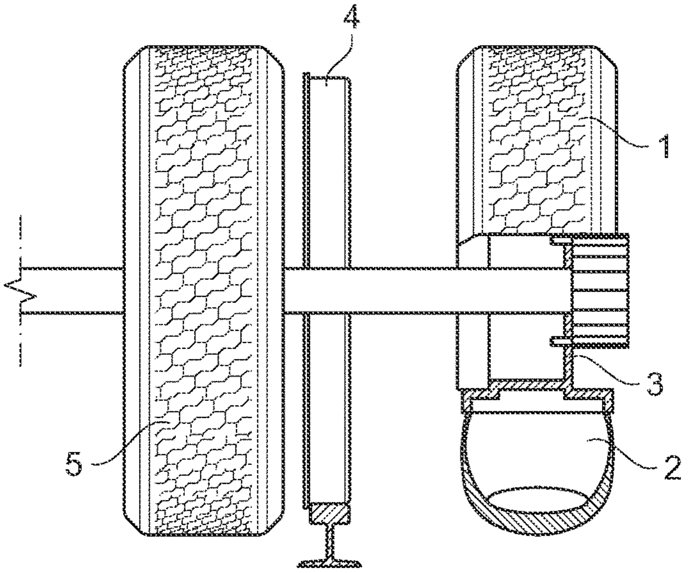
FIG. 1 is a schematic view, partially in cross-section, of a combination of a coaxially mounted roadway wheel and railway wheel, adapted, as paired with similar combinations to form bimodal wheel sets, for travel on railways and roadways.

Vehicles of the present invention are autonomously and selectively controllable by (a) remote controllers, such as may be located in a train locomotive or in a train system management location and (b) on-board controllers, as in conventional autonomous vehicles. The on-board controllers, in a selected railway mode, may function as slaves of the remote controllers. On conventional roadways, the vehicles are controlled in roadway mode as to speed and direction in the same manner as conventional autonomous vehicles, with or without human intervention. On railways and when entering onto or leaving off of railways, the vehicles are controlled, in railway mode, by remote controllers.

For operability on railways, vehicle support is provided by conventional railway wheels laterally spaced to conform to the conventional railway for which the vehicle is intended, 58½ inches between paired railway wheels being standard for conventional US railways. For operability on roadways, conventional roadway wheels preferably coaxially mounted with the railway wheels provide vehicle support, the radius of the roadway wheels exceeding that of the railway wheels by an amount less that the height of the rails of the railway on which the vehicles are intended to operate. As an example, for a railway with a rail height of seven inches, a difference of 3 to 5 inches between the radii of the roadway wheels and railway wheels would be preferred.

Coaxial mounting of the railway and roadway wheels may include co-mounting of all of the wheels on a single axle or on multiple axle components axially aligned with one another. For optimum vehicle stability paired roadway wheels are laterally located outboard of the railway wheels and at or near the maximum width-wise limits permitted for vehicles operating on conventional roadways, that limit being 102 inches for commercial vehicles on US interstate highways. For greater load support, a second pair of coaxially mounted roadway wheels, with the same radius as the outboard roadway wheels, may be disposed inboard of the railway wheels.

Vehicle steering and support mechanisms and structures selectively provide for roadway steering and railway track following, the former being disengageable in railway mode and the latter disengageable in roadway mode. For railway track steerage of wheels other than roadway steering wheels, the vehicle body may be pivotally mounted on the support structure for those wheels, thus permitting slight non-alignment of wheels and vehicle body. In roadway mode, alignment of vehicle body and support structure is assured and non-alignment prevented by a retractable mechanical member which, when not retracted, locks the vehicle body and support structure against pivotal movement therebetween. That retractable mechanical member may be one or more retractable posts offset from the lateral center of the support structure and extending upwardly from the support structure, such posts, when projected (i.e. not retracted), being received in mating recesses in the underside of the vehicle body.

Transition roadway-railway crossings, at which railway system vehicles (vehicles as disclosed herein) transition from railway mode to roadway mode (and vice versa), include inclined plane adjuncts or ramps laterally spaced to correspond to the lateral spacing of roadway wheels of system vehicles. These ramps adjoin the roadways at roadway grade level and extend away from the roadways along the length of the adjoining railways, declining in elevation to a lower end distal from the roadway, the vertical distance of the decline corresponding to the difference in wheel radii between the railway wheels and the roadway wheels of system vehicles. As so positioned and dimensioned, the ramps engage the bottommost portion of roadway wheels as they approach and leave the crossing.

With reference to FIG. 1, there is shown a bimodal wheel combination adapted to support, at least in part, vehicles as disclosed herein, such combinations including at least one roadway wheel 1, comprised of a pneumatic tire 2 surrounding a conventional wheel rim 3 and a co-mounted railway wheel 4, both positioned width-wise to conform to the gauge and width limitations of convention railway and roadway infrastructure.

Optional second roadway wheel 5 provides additional load support for such wheel combinations. Preferably, the coaxially mounted roadway wheel 1 (and 5 if included) include conventional automotive-type braking devices interiorly thereof (not shown).

This enables the roadway wheel brakes of a vehicle supported by such wheel combinations to effect braking of the vehicle in railway mode as well as in roadway mode. The radii of pneumatic tires 2 and 5 exceed that of railway wheel 4 by an amount slightly less than the height of the rails of the railway for which the wheel set is intended, typically in the range of 3 to 5 inches (7.62 to 12.7 cm). As an example, a vehicle as disclosed herein intended for travel in the US may include roadway wheels, 40 inches (101.6 cm) in diameter combined with railway wheels 33 inches (83.82 cm) in diameter to provide a 3½ inch (8.89 cm) radial difference between the bottommost part of the railway wheels and the roadway wheels, such that with a supported vehicle riding on a conventional railway track, the bottoms of the roadway wheels are 3½ inches below the upper level of the track and the bottoms of the railway wheels are roughly the same distance above the roadway grade when the vehicle is on a roadway or roadway grade.

Figure 2:
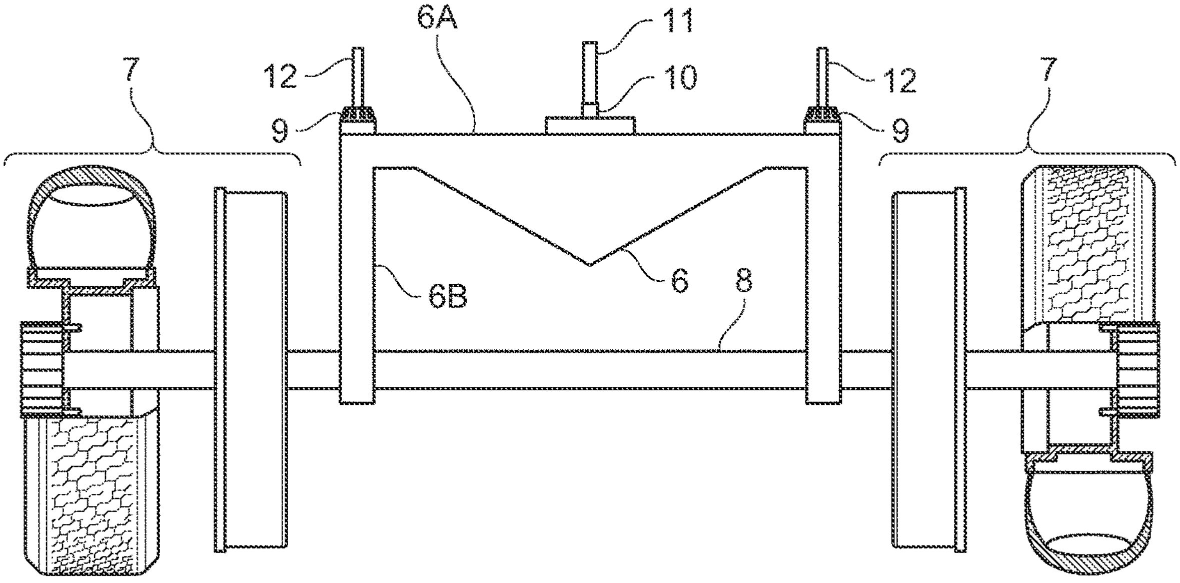
FIG. 2 is a schematic view of a pivotally mountable support structure for a bimodal wheel set comprised of coaxially mounted pairs of roadway and railway wheels.

While vehicles as disclosed herein may be mounted in a conventional manner on one or more pairs of roadway-railway wheel combinations as shown in FIG. 1, railway track steering of such vehicles is optionally facilitated by support of the load or passenger-carrying compartment of such a vehicle on at least one pivotally mounted support structure assembly, such as that shown in FIG. 2. That assembly comprises bolster 6 and paired bimodal wheel sets 7. Bolster 6 includes a horizontally disposed or weight-bearing section 6A, and downwardly extending sections 6B connected to axle 8, by which the weight of a supported vehicle is transferred to wheel sets 7. Bolster 6 further includes pivot post 11 extending upwardly from central bearing mount 10 on section 6A and retractable locking posts 12 extending upwardly from slidable, rounded side bearing mounts 9 non-centrally located on section 6A. Pivot post 11 is adapted to mate with and be received in a mating recess on the underside of the supported vehicle's upper compartment. Locking posts 12 are adapted to extend into mating recesses on the underside of a supported vehicle cargo or passenger compartment to prevent pivotal rotation of the support structure assembly when the supported vehicle is in roadway mode.

While roadway wheels and railway wheels are typically coaxially mounted in vehicles as disclosed herein, for certain purposes the roadway wheels and railways wheels may be offset. As an example, for conventional vehicle steering on roadways, the roadway wheels may be offset from the railway wheels (i.e. on separate axles, fore and aft of one another) to permit vehicle steering without interference of the railway wheels.

Figure 3:
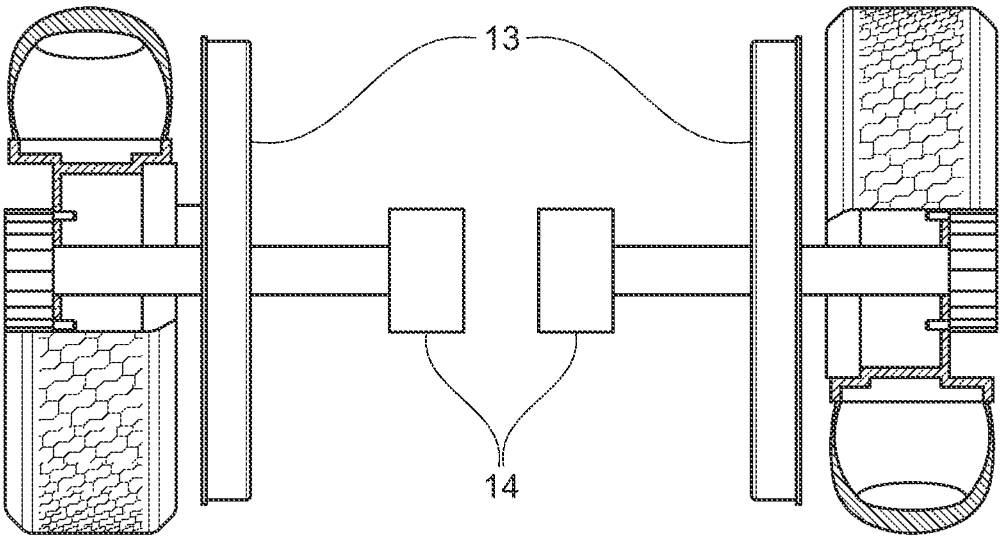
FIG. 3 is a schematic view of axially aligned but independent bimodal roadway-railway wheel combinations, each combination being associated with differentially speed controllable drives to provide vehicle roadway steerage.
Figure 4:
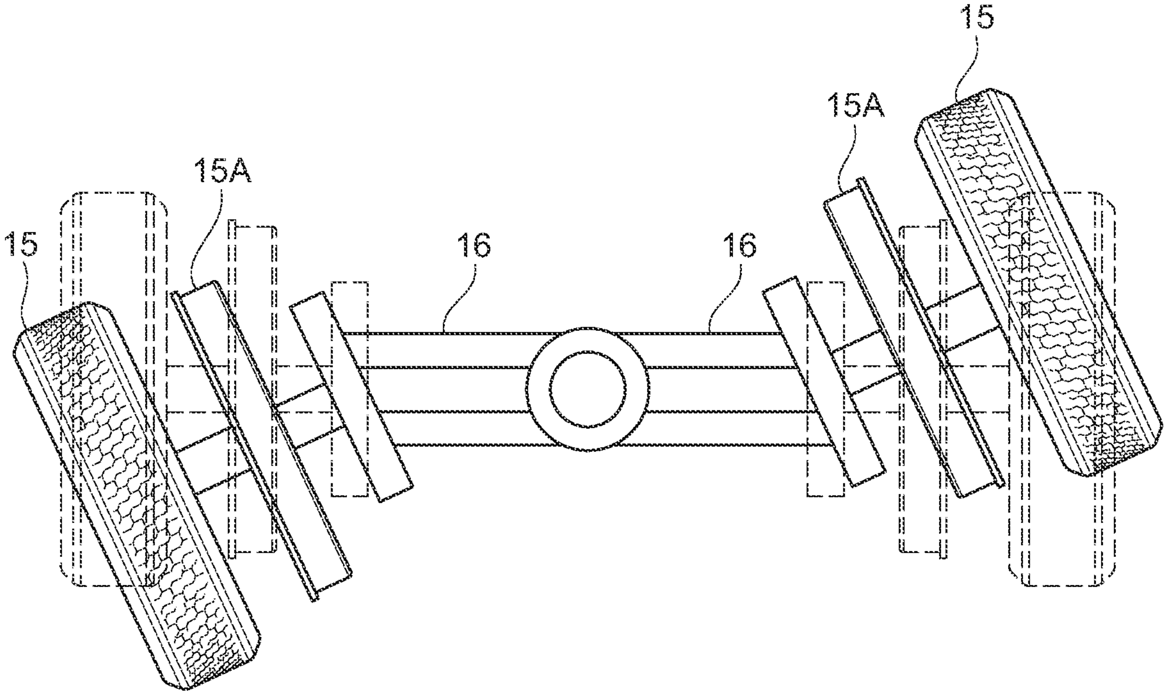
FIG. 4 is a schematic plan view of a steerable bimodal wheel combination, that combination being associated schematically with a conventional steering mechanism.

Still other exemplary applications of bimodal wheel sets for vehicles as disclosed herein are seen in FIGS. 3 and 4, comprising embodiments adapted primarily for roadway vehicle steering.

As shown in FIG. 3, two independently speed controlled axially aligned bimodal wheel sets 13 are independently connected to drives 14, drives 14 comprising either (a) variable speed transmissions driven by either one or more drive motors or (b) directly connected variable speed motors. In this embodiment, vehicle steering is effected by differentially controlling the rotational speed of the individual roadway wheels. For example, with the vehicle traveling in a straight line, the rotational speed of all of the wheels of sets 13 are driven at the same rotational speed as that of the other wheels supporting the vehicle. When the vehicle's driver (autonomous or otherwise) signals to steer the vehicle, curving it to the right or left, the rotational speed of the wheels on the outside of the intended curve is incrementally increased proportional to the overall speed of the vehicle and the degree of curvature called for by the driver.

FIG. 4 schematically depicts two coordinately controlled, axially aligned steerable bimodal wheels sets, each comprised of a pneumatic tired wheel 15 and a railway wheel 15A, associated with a conventional steering mechanism 16, mechanism 16 effectively maintaining the parallelism of each of the wheels in the respective wheel sets while permitting vehicle steerage. While wheel sets 15-15A are shown in an angularly steered configuration in FIG. 4, the non-steered (straight) configuration of the wheel sets is shown in phantom.

In railway mode, road steering mechanisms are disengaged to allow the steerable wheels to maintain alignment with tracks on which the vehicle is traveling.

Figure 5:
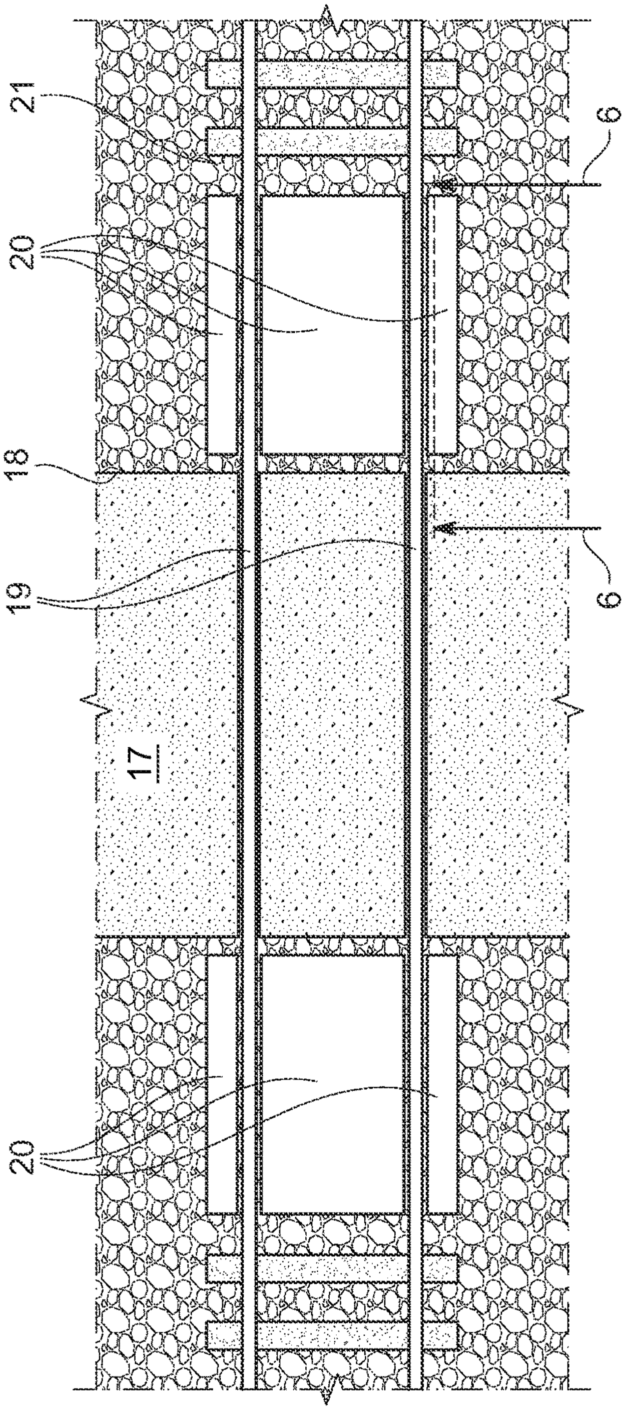
FIG. 5 is a schematic top view of a railway-roadway transition crossing including ramps to facilitate transition of vehicles as disclosed herein to and from the railway and roadway.
Figure 6:
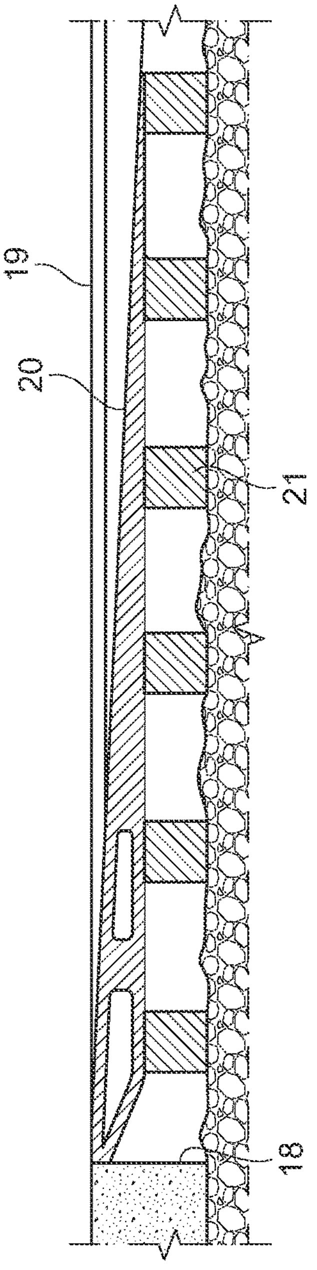
FIG. 6 is an enlarged cross-sectional view (in the plane 6-6 of FIG. 5) of a portion of the railway-roadway transition crossing and ramps shown in FIG. 5.

With reference to FIG. 5, there is shown a railway-roadway transition crossing 17 for transition of vehicles as disclosed herein from railway to roadway travel and vice versa, crossing 17 including roadway 18 and railway tracks 19 at roadway grade level, roadway 18 being part of, or connected to, a conventional network of streets and roads. Roadway 18 may also be part of a dedicated parking or holding area, where a driver may board the vehicle for transport on public highways or where the vehicle may be positioned for transfer to a later train. Crossing 17 further includes ramps 20 seated on railroad ties 21, as better seen in the FIG. 6 enlarged cross-sectional view, in the plane 6-6, of crossing 17. As a vehicle with wheels sets as described above approaches or leaves crossing 17, the roadway wheels of such vehicles engage ramps 20, either raising the vehicle for support of the vehicle by the roadway wheels to grade level or lowering it to return the vehicle to support on the railway wheels as the vehicle leaves the crossing. While the transitional raising and lowering of such vehicles may be accomplished by road material, such as soil or rock, disposed alongside the rails and graded into the necessary incline (as has been suggested in the prior art), ramps 20, comprised preferably of structural metal, are preferred, by virtue of their manufacturability and transportability, to facilitate the adaptation of conventional infrastructure for use by vehicles as disclosed herein. The length of ramps 20 and the number of supporting ties will vary according to the slope gradient desired. Alternative to a single metallic structure, ramps 20 may comprise plane (possibly perforated) metal surface members supported by upwardly extended tie segments or downwardly extended legs, either in effect defining the angle of the ramp incline.

Operationally, a vehicle approaching transition from roadway wheel support to a railway is autonomously controlled to ensure alignment of the vehicle's railway wheels with the rails to be engaged upon transition.

A railway network including tracks adapted for operation of vehicles as disclosed herein includes transition crossings as described above at all roadway-intersections including a track so adapted. Intersecting track switches along network tracks adapted for operation of vehicles as disclosed herein also require accommodation to avoid roadway wheel-rail interference at such switches. In addition to ramps or grades on both ends of such intersections. grade level supports, level rather than inclined but otherwise similar to ramps 20, may be disposed between the rails of the switch, the grade level supports being configured to permit the lateral movement of movable track segments.

For travel in railway mode, vehicles as disclosed herein may require (depending on vehicle length and other factors) that one or more sets of supporting wheels be freely steerable in railway mode (i.e. pivotable, at least to a limited extent, on a vertical axis) in order to track the rails on which the wheels are mounted. One such pivotally mounted wheel set is described above with reference to FIG. 2. For greater load support, wheel sets for supporting vehicles as disclosed herein are preferably mounted on bogies similar to those on which rail cars are conventionally supported, adapted as shown in FIGS. 7-10, 12 and 13.

Figure 7:
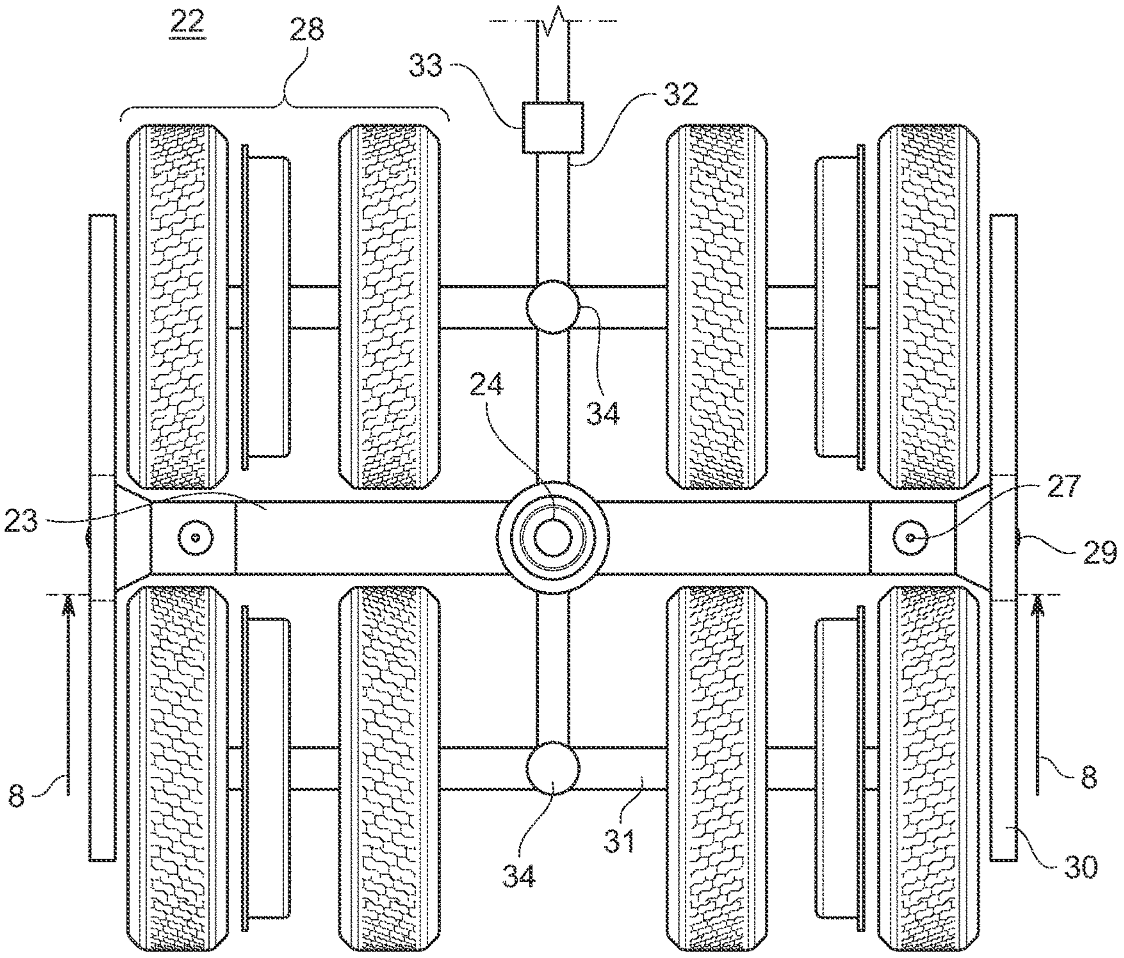
FIG. 7 is schematic a top view of a powered pivotally mountable, lockable bogie including bimodal wheel sets.
Figure 8:
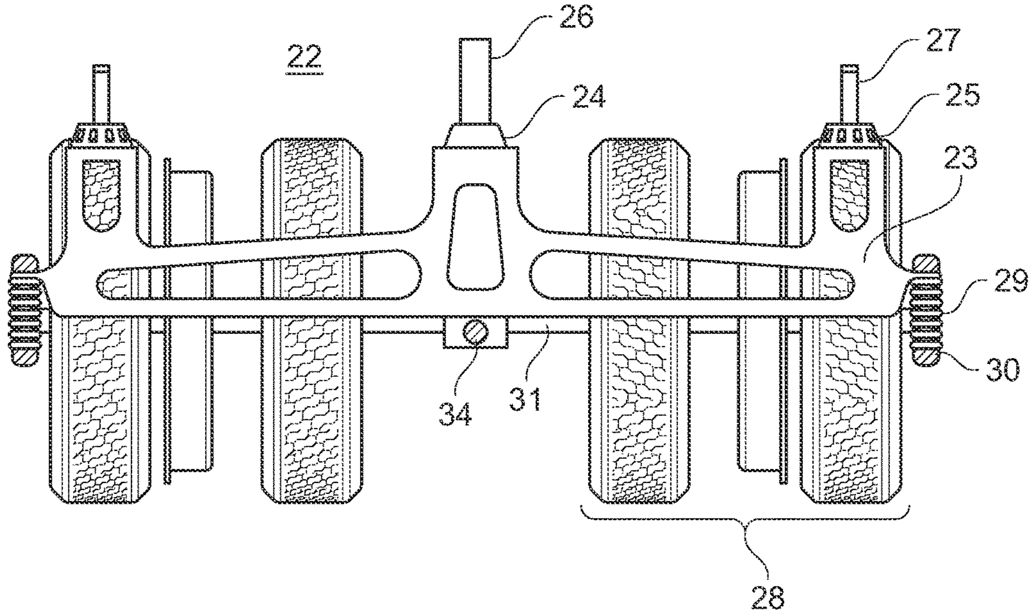
FIG. 8 is a cross-sectional view of the bogie shown in FIGS. 7, taken in plane 8-8 of FIG. 7.
Figure 9:
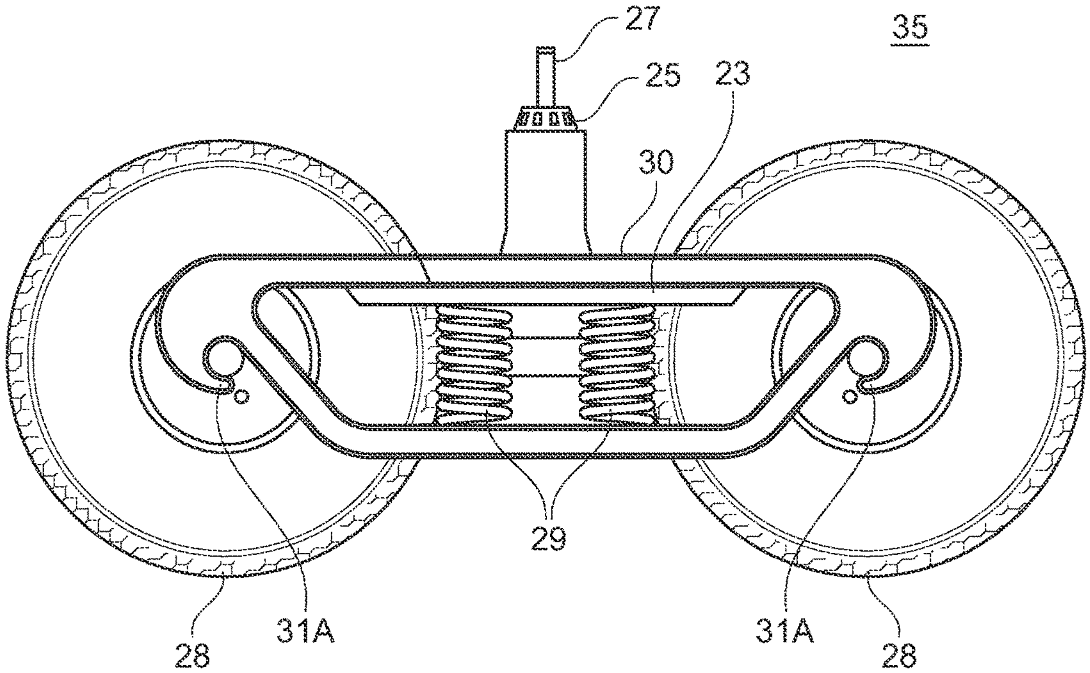
FIG. 9 is a schematic side view of the bogie shown in FIGS. 7 and 8.

FIGS. 7-9 depict a powered bogie 22 with a load-supporting booster 23 including load-bearing central bearing support 24 and lateral load-bearing supports 25. From central bearing support 24, pivot post 26 projects upwardly for mating with a receiving recess in the supported vehicle underside. From lateral bearing supports 25, retractable locking posts 27 extend upwardly for mating with receiving recesses in the underside of a supported vehicle. With locking posts 27 retracted, pivotal movement of bogie 22 around pivot post 26 is permitted to allow rail tracking. With locking posts 27 extended, such pivotal movement is prevented for roadway travel. While various means may be provided to effect extension and retraction of locking posts 27, threaded engagement of locking posts 27 in lateral bearing supports 25, together with remotely controlled rotational drivers attached to such posts, are one such means to do so.

Vehicle weight is transferred from booster 23 to axles 31 of bimodal wheels sets 28 by virtue of the outward ends of booster 23 resting on the tops of vertically oriented booster springs 29, the lower ends of which rest on a member of side frames 30, side frames 30 also including bearing mounts 31A supporting axles 31, thus supporting the weight of the supported vehicle while permitting rotations movement thereof. Unlike the comparable components of the rail car bogie from which it is adapted, booster 23 extends outwardly to, and side frames 30 are disposed at or near, the width-wide limits of the supported vehicle, thus permitting the outer roadway wheels of wheel set 29 also to be located near the width-side limits of the supported vehicle.

As adapted for the support of the drive wheels of an otherwise conventional tractor-trailer tractor, powered bogie 22 also includes drive shaft 32 with a rotatable connection 33 to a drive motor shaft (not shown) at one end and differentials 34 at its intersections with drive wheels axles 31. As adapted for non-driven wheel sets, drive shaft 32 and one or both of differentials 34 would simply be omitted.

Figure 10:
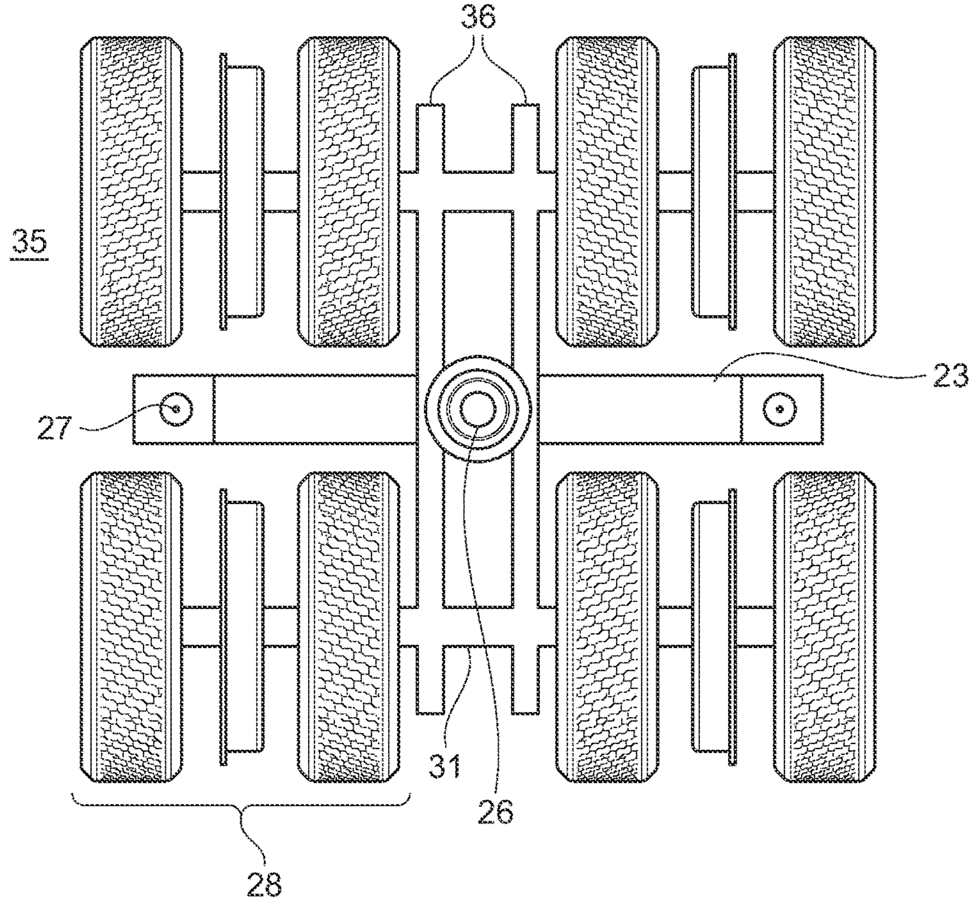
FIG. 10 is a schematic top view of a lockable, pivotally mountable bogie for supporting the bimodal non-drive wheels of a vehicle.

FIG. 10 depicts, in top view, non-powered bogie 35 adapted for support of non-driven bogie wheels of vehicles as disclosed herein. With elements otherwise similar to those of powered bogie 22, (with corresponding members similarly enumerated), the side frames 36 and associated bolster springs of non-powered bogie 35 are disposed inboard of the roadway wheels and railway wheels of bogie 35, permitting outboard roadway wheels of those sets to be located at the width-wide outer limits of a supported vehicle.

Figure 11:
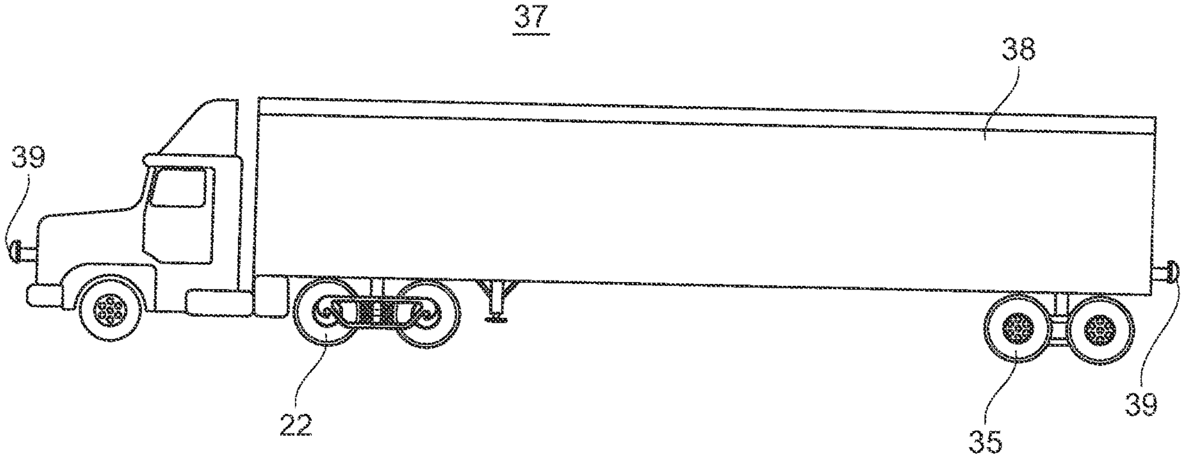
FIG. 11 is a side view of a tractor trailer truck-type vehicle adapted for railway and roadway use with bogies as shown in FIGS. 7-10.

FIG. 11 depicts one embodiment of vehicles as disclosed herein, namely an autonomously drivable but otherwise conventional tractor trailer truck type vehicle 37, supported by powered bogie 22 and non-powered bogie 35, together supporting the cargo-carrying compartment of trailer 38. As configured for train or convoy travel, vehicle 37 also includes remotely controllable couplers 39.

Figure 12:
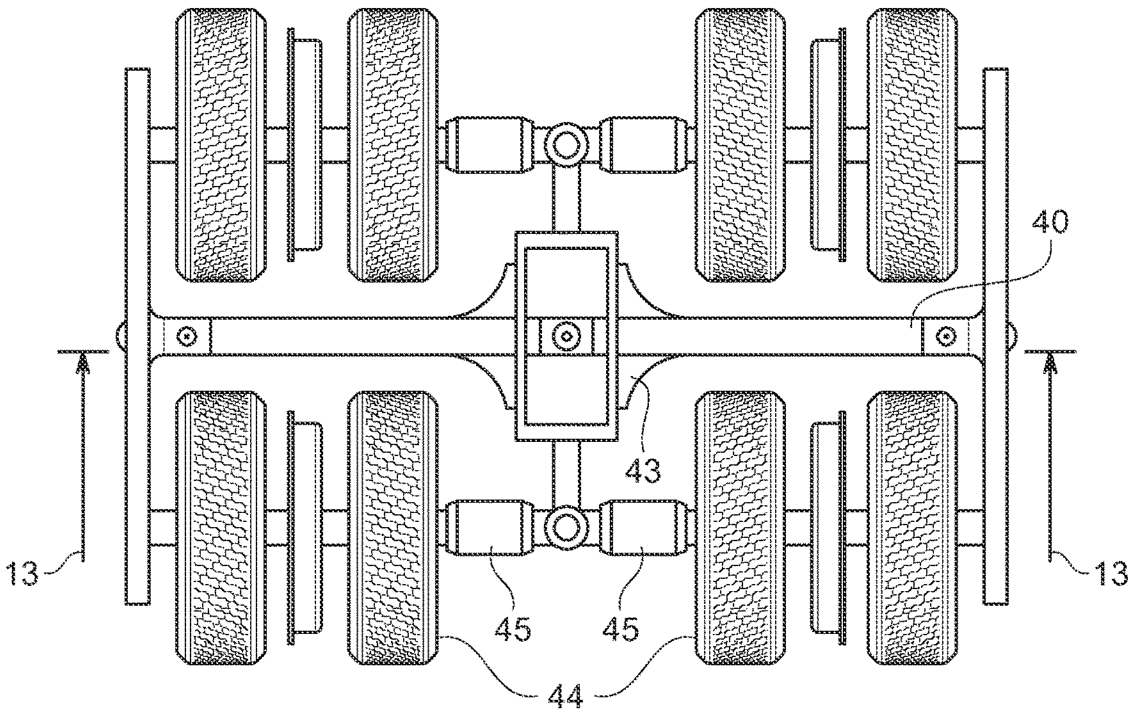
FIG. 12 is a schematic top view of a powered vehicle supportive bogie including bimodal wheel sets and an electric drive motor.
Figure 13:
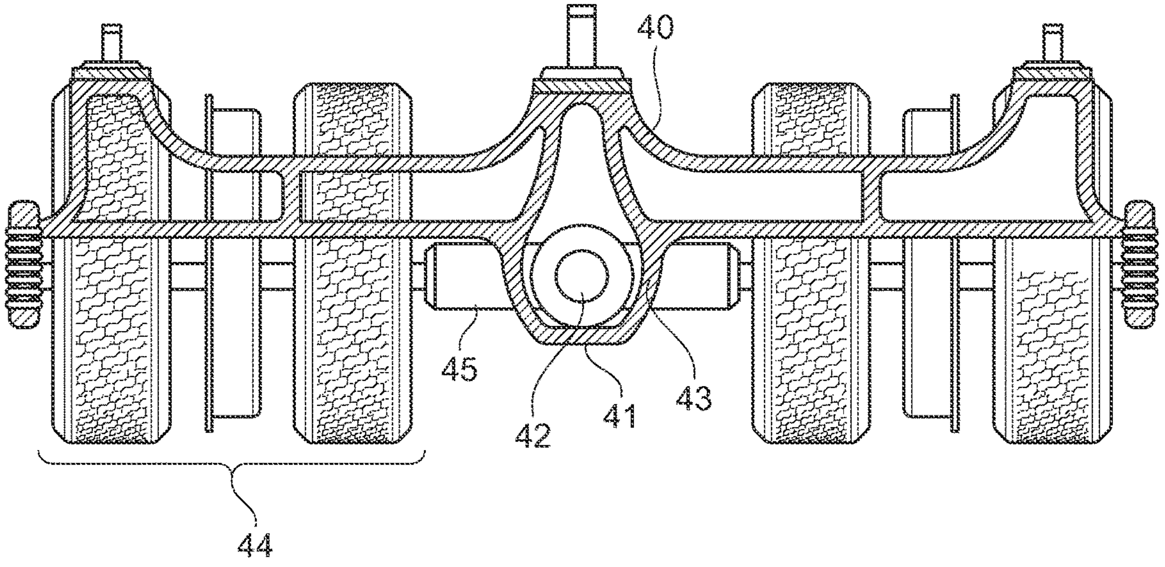
FIG. 13 is a cross-sectional view of the bogie shown in FIG. 12 in the plane 13-13 of FIG. 12.

As adapted to include an electrical motor providing vehicle motive power, a powered bogie similar to that shown in FIGS. 7-10 above, is shown in FIGS. 12 and 13. The bogie shown in FIGS. 12 and 13 includes a modified bolster or support member 40 configured to support a motor mount 41 and motor 42 with downwardly flared segment 43. Motive power is provided to wheel sets 44 from motor 42 through differential and speed-power-controlling transmissions 45 or by direct control of motor 42, in which case transmissions 45 may be omitted.

All of the wheel sets and wheel set combinations as described herein may be adapted to a wide variety of vehicles, including both specialized vehicles and otherwise conventional vehicles, such as tractor trailer trucks, bulk or liquid transport trucks, refrigerated cargo carrying trucks, buses and commuter vehicles, differing otherwise only by the inclusion of (a) autonomous driving systems, selectively addressable by on-board and remote controllers (b) if intended for train or convoy use, remotely controlled couplers compatible with those of other similar vehicles or with those of conventional railroad cars, and (c), if necessary, structural reinforcement to convey the train driving force from one end of the vehicle to the other and/or vehicle to vehicle power and signal-carrying electrical connections. Specialized vehicles may include power generating equipment or power storage equipment. For example, battery laden specialized vehicles charged initially in a power-rich geographic area through which trains pass, may be added to trains passing through that area, then to serve as a power source to recharge electrically driven vehicles in those trains while en route, thereby to deliver each of those electrically driven vehicles fully charged at its demerge location.

Trains, including pluralities of vehicles as disclosed herein, may be assembled, disassembled and reassembled conveniently with mechanical and human intervention limited to that effected through the autonomous control systems, all as exemplified by the process described with reference to FIG. 14. On a larger scale, entire rail systems may comprise such trains together with networks of digitized trackage including transition crossings and related controls for remotely controlling vehicles and trains operating thereon.

Figure 14:
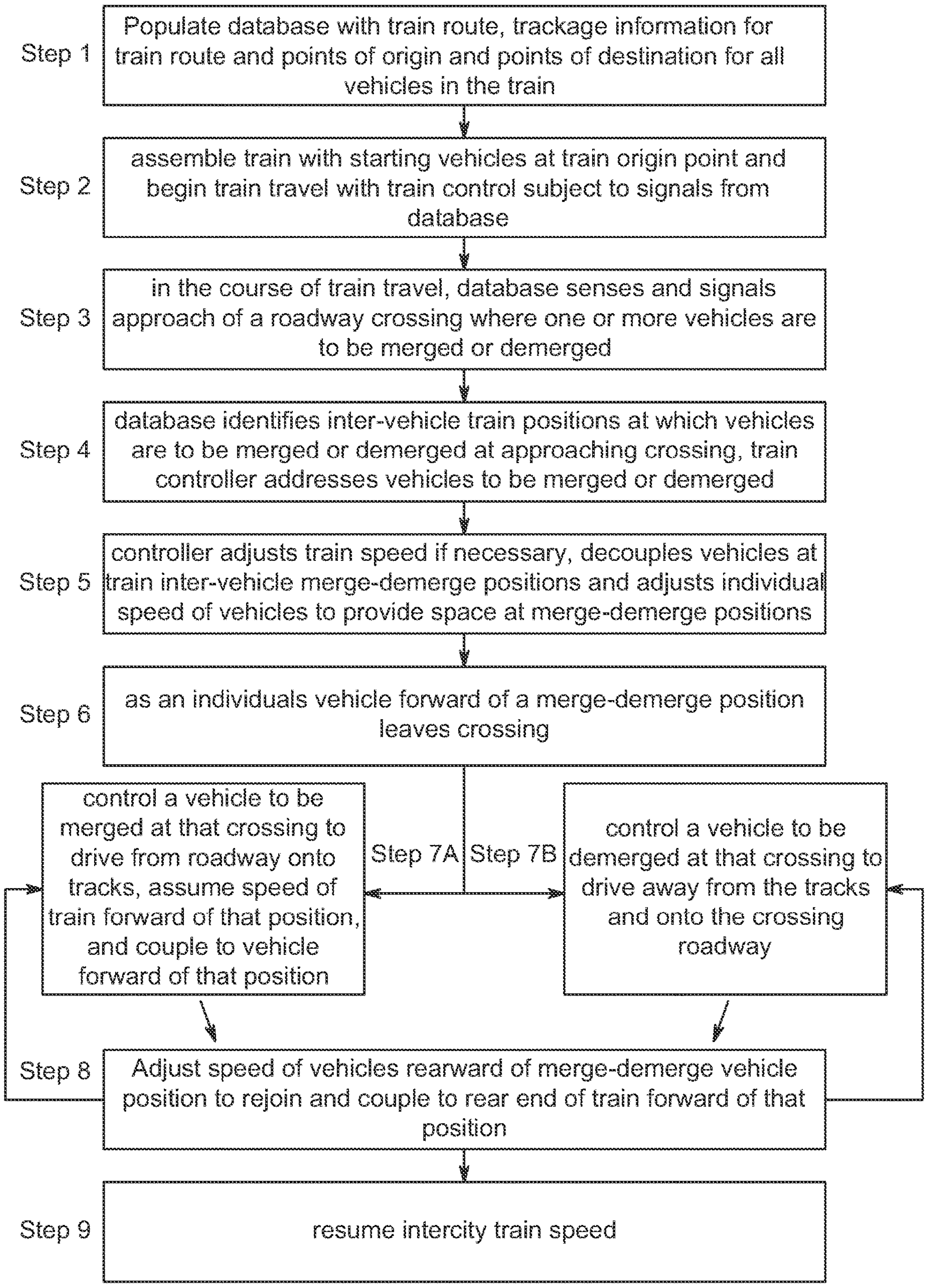
FIG. 14 is a diagrammatic illustration of a process by which a moving train may merge and demerge autonomous train vehicles even while continuing its forward progress.

FIG. 14 illustrates one process of several steps by which a train may be autonomously controlled to merge or demerge train vehicles, including while the train is in motion. In Step 1, a train control database is established. That database includes digitization of a railway route from the train origination point to the train destination point, including the location of roadway-railway transition crossings along that route adapted for the merging and demerging of individually operable autonomously controlled vehicles in the train. The database also includes a listing of autonomously operable vehicles to be included in the train for part or all of the train's railway route, information for communicating with each of those vehicles and the locations of the transition crossings where each of the train vehicles will be merged into the train and demerged from it. The train also includes location sensors to signal the location of train vehicles relative to the railway route and the transition crossings on that route.

In Step 2, once initially assembled at the point of train origin (possibly utilizing the autonomous operability of train vehicles in the assembly process) the train is controlled, typically by a train controller such as a programed computer operated with or without human assistance, to proceed from its point of origin toward its point of destination with train motive power provided by a locomotive or by on-board vehicle motors or by some combination thereof. Other than at or near transition crossings, the train is controlled with regard to conventional speed, safety limits and necessary stops.

Steps 3-9 involve in-route vehicle merger-demerge operations. In Step 3, sensors, defining the train position with respect to transition crossings at which any train vehicle is to be merged or demerged, signal the approach of one such crossing. This triggers Step 4 in which the database signals the train controller to control speed appropriate for the merge-demerge operations, identifies all inter-vehicle positions where any mergers and demergers are to occur, puts all vehicles rearward of any merge-demerge position into self-powered mode and, in Step 5, signals the controller to uncouple vehicles at those positions and to control speeds of vehicles forward and rearward of those positions to accommodate the merge-demerge operations.

In Step 6, as the train position sensors indicate a vehicle forward of any merge-demerge inter-vehicle position passing over the transition crossing location, the train controller addresses the vehicle to be merged or demerged at that position and either by direct control of that vehicle or by indirect control (such as by providing instructions to the vehicle's on-board controller) of the autonomous system in that vehicle, drives that vehicle either (Step 7A) from the roadway of the crossing into alignment with other vehicles in the train on the train railway or (Step 7B) away from the railway onto the crossing roadway.

Subsequently, (Step 8) the speed of vehicles rearward of the merger-demerger position is adjusted for those vehicles to rejoin vehicles forward of that position and adjacent vehicles there are coupled to one another.

If additional vehicles are to be merged or demerged at that transition crossing, the process returns to either Step 7A or 7B. Otherwise, the process proceeds to Step 9 in which the train controller puts all vehicles in what may be referred to as inter-city power mode and causes the train to resume normal operation.

While described with reference to FIG. 14, and a train in motion, a train as otherwise described herein may also be assembled in a static or semi-static mode with some individual components at rest, rather than in motion.

For example, a train comprised of a plurality of autonomously drivable vehicles capable of operating on both railways and roadways may be assembled by positioning at least one such vehicle on or near a transition crossing and driving that vehicle onto the railway at that crossing, coupling it to any other vehicles already on that railway, and repeating that process until the train is fully assembled. Such an operation may be performed, for example, in a railroad marshalling yard.

Accordingly, a variety of alternative processes may also be devised for the assembly and disassembly of trains, both in motion and at rest, and for trains comprising only autonomously driven vehicles or some combination of such vehicle with conventional railroad cars.

As used herein with reference to roadways, railways and devices, the word "conventional" refers to the standards for such roadways, railways and devices as may be established by governmental regulations, industry wide agreements or common use, and which may vary from country to country or industry to industry.

As used herein, the terms railway and railways' rails, refer to conventional railways, of which thousands of miles are already in use around the world. The present invention is intended to provide a more efficient use of at least some of these existing railways with little or no modification.

As used herein, the terms "autonomous vehicle," "autonomously operated vehicle" and "autonomously operable vehicle" refer to vehicles, including cars and trucks, controlled by electronic devices and software that permit vehicle operation with little or no human intervention, typically adapted to travel digitized paths, such as digitized roadways and railways. Vehicles of this type are well known, sometimes referred to as "self-driving" vehicles, and many such vehicles and components thereof have already been patented.

Necessarily, control of such vehicles requires associated electronic controllers, computers, sensors, activators and related software to interconnect such devices, various forms of all of which are well known.

While the foregoing invention has been described primarily with regard to intermodal railway-capable tractor trailer truck-type vehicles, those skilled in the art may also find many of the concepts embodied herein useful in other types of vehicles such as commuter vehicles and individual passenger or multiple passenger-carrying vehicles.

The incorporation of a plurality of such vehicles in trains and the assembly of a plurality of such trains in systems including related trackage, transition crossings and control systems are also part of this invention. Accordingly, while this invention and parts thereof have been described herein with reference to specific exemplary embodiments, the claims which follow are intended to define these and other embodiments which may be devised by those skilled in the art to which the invention applies but which are nevertheless within the true spirit and scope of the present invention.

The invention claimed is:

1. A vehicle capable of operation on a conventional roadway and on a conventional railway, the roadway having a widthwise limit, the railway having a standard gauge and rails of a standard height, the roadway and the railway intersecting on a common grade, the vehicle including an autonomous driving system addressable by both on-board and remote controllers, and a support structure including at least two bimodal wheel sets, each bimodal wheel set of the at least two bimodal wheel sets comprising two railway wheels laterally spaced on an axis to conform to the gauge of the conventional railway and two roadway wheels laterally spaced on said axis outward of the railway wheels within a maximum widthwise limit of the conventional roadway, the radius of the roadway wheels exceeding the radius of the railway wheels by an amount less than the standard height of the rails.

2. A vehicle as recited in claim 1, including at least one bimodal wheel set having two additional roadway wheels inboard of the railway wheels, all of the roadway wheels having a common radius.

3. A vehicle as recited in claim 1, wherein the wheels of each wheel set are aligned on a common axle.

4. A vehicle as recited in claim 1, further including remote-controlled couplers at one or both ends of the vehicle.

5. A vehicle, as recited in claim 1, including at least one bimodal wheel set having a weight bearing connection with a pivotally mounted supporting structure comprising a horizontal supporting member adapted to support the vehicle, the horizonal supporting member being parallel to the axis and including a central weight bearing surface located on a central point of the horizontal supporting member and having a pivot member extending upwardly therefrom, and at least one non-central weight bearing surface located on or between a horizontal edge of the horizontal supporting member and the central weight bearing surface and having an upwardly extending selectively retractable anti-pivot locking post.

6. A vehicle, as recited in claim 5, wherein the at least one non-central weight bearing surface is configured to slide horizontally along the horizontal supporting member.

7. A vehicle, as recited in claim 5, including two pivotally mounted supporting structures disposed at opposite longitudinal ends from one another along the length of the vehicle, each of said supporting structures comprising (a) two bimodal wheel sets, each bimodal wheel set including two additional roadway wheels laterally spaced along the axis inboard of the railway wheels.

8. A train comprised of a plurality of vehicles as recited in claim 5.

9. A railway network including transition crossings adapted for operation of vehicles selectively controllable by remote controllers in a train locomotive or at a management location as recited in claim 5.

10. The railway network of claim 9, wherein the transition crossings have adjoining ramps that intersect on a common grade to facilitate transition between railway and roadway modes of operation.

11. A train system comprising the vehicle as recited in claim 5, the system including a plurality of roadway-railway transition crossings, those crossings including inclined plane adjuncts adjoining the roadway and extending away therefrom and along the railway, the adjuncts being laterally spaced correspondingly to the lateral spacing of the roadway wheels of system vehicles, each of the inclined plane adjuncts having an upper end adjoining the roadway at the level of the roadway and a lower end distal therefrom and at the level of the lowermost portion of the trains' vehicles' roadway wheels.

12. A train system as recited in claim 11, wherein each of said adjuncts is a structural assembly with a flat surface inclined from the level of the lower end of the adjunct to the level of the upper end of the adjunct with supporting legs along the adjunct from the lower end to the upper end thereof, each of the legs resting upon a rail supporting tie located under the adjunct.

13. A train system as recited in claim 11, wherein said adjuncts include a flat load bearing surface supported by specialized rail-supporting ties, each of the specialized ties having upstanding segments laterally spaced to conform to the lateral spacing of system vehicle roadway wheels and of graduated vertical dimensions extending above the tops of adjacent rails and defining the incline of the adjuncts from the lower end to the upper end thereof.

14. The train system of claim 11, wherein the plurality of roadway-railway transition crossings have adjoining ramps that intersect on a common grade to facilitate transition between railway and roadway modes of operation, and wherein each train consists of a plurality of vehicles.

15. A railway transition structure adjoining the roadway of a roadway-railway crossing and adapted to engage the roadway wheels of a bimodal vehicle having coaxially mounted railway wheels and roadway wheels, the radius of the latter exceeding that of the former by an amount less than a rail height of the railway, as a vehicle supported by said wheels approaches and departs from the crossing, the structure comprising an inclined vehicle-supporting surface composed of structural metal, the upper end of which adjoins the roadway and the lower end of which is disposed distally therefrom along the railway, said vehicle-supporting surface including laterally distinct segments at lateral positions corresponding to the lateral disposition of vehicle roadway wheels for which the transition structure is intended, said laterally distinct segments including a plurality of generally vertical supporting members the upper ends of which are of graduated height defining the gradient of the inclined plane vehicle-supporting surface supported thereby.

16. A vehicle support structure comprising (a) at least one pair of bimodal wheel sets each wheel set having a common axle and consisting of two railway wheels and two roadway wheels, the roadway wheels having a radius 3 to 5 inches larger than that of the railway wheels, and (b) a mounting member including (i) a horizontally disposed vehicle weight-bearing surface, (ii) a pivot post extending upwardly of the weight bearing surface and disposed centrally of said wheel set pair or pairs, (iii) at least one retractable post upwardly extending from the weight bearing surface and disposed non-centrally of said wheel set pair or pairs and (iv) a weight transmitting connection between the horizontally disposed weight-bearing surface and said wheels.

17. A vehicle support structure, as recited in claim 16, including two pairs of bimodal wheel sets.

18. A vehicle support structure, as recited in claim 17, wherein the weight transmitting connection comprises the laterally outward ends of the weight bearing surface resting on top of vertically oriented bolster springs, the bolster spring's lower ends in turn resting on a lower arm of a side frame, each side frame including bearing mounts in which are received bimodal wheel set axles.

19. A vehicle support structure, as recited in claim 18, said mounting member including a motor mount, said structure further including at least one motor connected to drive rotational movement of one or more of the wheel sets.

20. A process for attaching to a train on a train track one or more autonomously drivable vehicles, said vehicles including coaxially mounted roadway and railway wheels, the radii of the former exceeding the radii of the latter by an amount less that the height of the rails of the track, the process comprising positioning said vehicles at one or more holding locations selected from the group consisting of the train track and a roadway crossing, the roadway crossing having an inclined vehicle-supporting surface composed of structural metal adapted to engage the roadway wheels of the vehicles, the inclined vehicle-supporting surface including a plurality of generally vertical supporting members, the process further comprising autonomously driving each of said vehicles from said holding location onto the train track and into engagement with adjacent train vehicles and coupling it to those adjacent train vehicles.

21. A process for operating a train on a railway track, the train comprising a plurality of autonomously drivable vehicles capable of operating on both railways and roadways by virtue of coaxially mounted roadway and railway wheels, the radii of the former exceeding the radii of the latter by an amount less that the height of the rails of the track, the track including one or more roadway-railway transition crossings having inclined ramps adapted to engage the roadway wheels of the vehicles as the vehicles approach and depart from the roadways, the process further comprising merging and demerging individual vehicles to and from the train while the train is in continuous or intermittent motion, the process comprising:

a. Establish a database of (i) a railway route, from a point of origin to a point of destination, to be taken by the train, including all roadway-railway transition crossings on the route adapted for merging and demerging vehicles to or from the train and of (ii) the identity of autonomously controlled vehicles to be included in the train and the locations, along said route, at which each of said vehicles is to be merged into the train and at which each of said vehicles is to be demerged from the train b. Assemble initial train components and control train to begin travel from its point or origin to its ultimate destination, c. As the train proceeds from its point of origin toward its point of destination, sense when the train approaches a roadway crossing location along said route at which any of said vehicles is to be merged into or demerged from the train, identify and establish communication with all train vehicles to be merged or demerged at that crossing and identify the train inter-vehicle positions at which those vehicles are to be merged or demerged d. Uncouple any train vehicles forward and rearward of said positions and control the speed and direction of any train vehicles rearward of said positions to provide intervehicle train space for the mergers and demergers e. When said intervehicle train space is at a transition crossing at which mergers or demergers associated with that intervehicle train space are to occur, signal each vehicle to be demerged at that crossing as the intervehicle train space approaches that crossing to drive away from the railway at that crossing and signal any vehicle to be merged at that crossing and at that intervehicle train space to drive onto the railway as that intervehicle train space approaches the crossing f. Control the speed of all vehicles rearward of each merger-demerger intervehicle position to bring the forward and rearward vehicles at those positions into coupling position and then couple those vehicles g. Resume normal train speed.

* * * * *